United States Patent [19]
Calmettes et al.

[11] Patent Number: 5,377,389
[45] Date of Patent: Jan. 3, 1995

[54] CLAMPING SPRING COLLAR

[75] Inventors: Lionel Calmettes, Romorantin Lanthenay; Pascal Detable, Gievres, both of France

[73] Assignee: Etablissements Caillau, Issy les Moulineaux, France

[21] Appl. No.: 201,937

[22] Filed: Feb. 24, 1994

[30] Foreign Application Priority Data

Feb. 26, 1993 [FR] France ................................ 93 02259

[51] Int. Cl.⁶ ...................... B65D 63/00; F16L 33/00
[52] U.S. Cl. ................................ 24/20 R; 24/20 CW; 24/20 EE
[58] Field of Search ............ 24/20 R, 20 CW, 20 EE, 24/20 TT, 20 S, 23 W, 20 W

[56] References Cited
U.S. PATENT DOCUMENTS

| | | | |
|---|---|---|---|
| 4,305,179 | 12/1981 | Sakurada | 24/20 R |
| 4,583,268 | 4/1986 | Klöss | 24/20 R |
| 5,048,159 | 9/1991 | Johansson et al. | 24/20 R |

FOREIGN PATENT DOCUMENTS

| | | |
|---|---|---|
| 0443681 | 8/1991 | European Pat. Off. |
| 811968 | 1/1937 | France |
| 3026582 | 2/1982 | Germany |
| 3327386 | 6/1984 | Germany |

Primary Examiner—Victor N. Sakran
Attorney, Agent, or Firm—Marshall & Melhorn

[57] ABSTRACT

A clamping spring collar, constituted by a rolled-up metal strip having end portions each of which is of a width substantially equal to half the width of the strip, said end portions being disposed side by side and being provided with respective tabs that are directed radially outwardly from the collar, which tabs form abutments for engaging a pliers-like tool, the strip having a cross-section that constitutes a flattened V-shape such that the central region of the inside surface of the collar has a diameter that is smaller than that of its lateral regions, wherein the angle formed between the two branches of the V-shape lies in the range 120° to 165°, and wherein the ratio between the thickness of the strip and the length of each of its branches itself lies in the range 0.2 to 0.5.

1 Claim, 1 Drawing Sheet

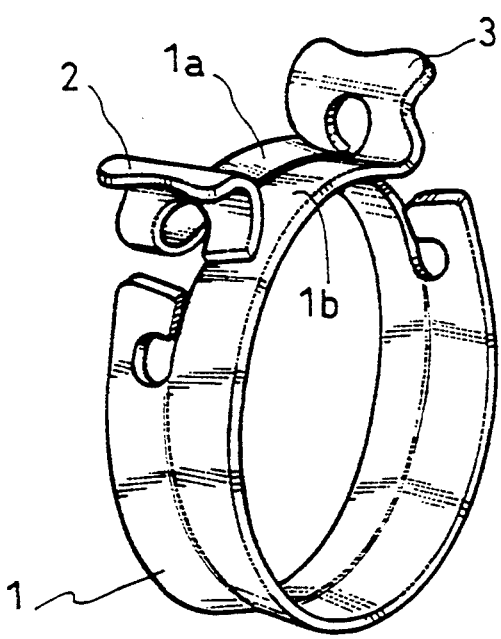
FIG_1
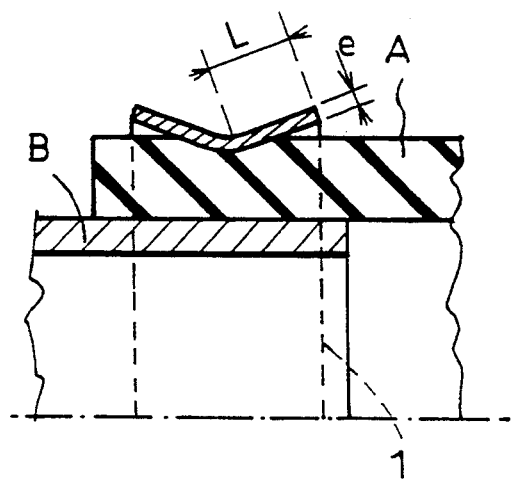
FIG_2

CLAMPING SPRING COLLAR

FIELD OF THE INVENTION

Collars for clamping a flexible hose on a rigid pipe and generally referred to as "spring collars" are known, in particular from French patent FR-A-81 1 968 and European patent EP-A-0 443 681. Such a collar is essentially constituted by a rolled-up metal strip, with the end portions of the strip being of a width that is equal to substantially half the width of the strip, and being disposed side by side. Each end portion is also provided with a tab that is directed radially outwardly from the collar and that constitutes an abutment for engaging the jaws of a pliers-like tool.

BACKGROUND OF THE INVENTION

The metal used is selected or appropriately treated not only to have good bending strength, but above all to have rigidity that is appropriate to its use. Such a collar is put into place by moving the above-specified abutments towards each other by means of a pliers-like clamping tool. This increases the diameter of the collar, thereby making it easily engaged by axial sliding on the hose or other object to be clamped. When the force urging the abutments towards each other ceases to be applied, the energy stored in the collar is released so the collar clamps the hose by attempting to return to its initial diameter.

Consequently, the clamping force of the collar depends on how much its diameter is increased compared with its diameter in the rest state. In addition, given its structure, the collar is capable of deforming elastically to track fluctuations in the diameter of the object to be clamped, and it is thus capable, in theory, of maintaining adequate clamping. This property is particularly important when clamping flexible hoses made of rubber or like materials that are fitted over rigid tubes, whenever it is desired to provide leak-proof connections for ducting that conveys fluids at varying temperatures. Such hoses are known to be liable to creep, so it is therefore desirable for the collar to compensate automatically for any reduction in the diameter of the hose.

The above-mentioned European patent also proposes improving the stiffness of the collar and its bending strength without increasing the thickness of the metal strip. To this end, it provides for reinforcing ribs on the strip that project from the outside surface of the collar and that extend over substantially all of the periphery thereof. However, although that solution is theoretically capable of achieving the desired results, it suffers from the particular drawback of being relatively expensive and sometimes difficult to manufacture, in particular whenever the strip is of any significant thickness.

It will also readily be understood that the clamping pressure exerted by the collar on the periphery of the object to be clamped, in particular a hose that is liable to creep, depends on the bearing area between the collar and the object. In this respect, proposals have already been made, in particular in patent DE-A-3 026 582, to impart a V-shaped section to the strip from which the spring collar is made, in particular for the purpose of increasing the clamping force it provides compared with that of a circular section collar of the same area.

However, collars in accordance with that German patent suffer from the drawback of exceeding the elastic limit of the metal in certain zones of the collar section when the collar is installed on the object to be clamped. As a result, in the event of the diameter of the object to be clamped reducing, e.g. because of creep in a hose, the clamping force of the collar and in particular the clamping pressure on the surface of the object to be clamped runs the risk of being insufficient to ensure that a coupling continues to be leak-proof.

In performing research to improve the efficiency of spring clamps, and in particular of those described in the above-mentioned German patent, while simultaneously seeking a clamp that is as simple and as cheap as possible to manufacture, the Applicant has observed that the angle between the branches of the V-shape of the collar section can be designed so as to avoid any risk of exceeding the elastic limit in certain zones of the collar while it is being put into place. Thus, the general advantages of spring collars as recalled above can be retained even if the diameter of the object to be clamped, and more particularly of hoses involved in leak-proof couplings, varies quite considerably in use.

OBJECT AND SUMMARY OF THE INVENTION

The present invention therefore relates to a spring clamping collar constituted by a rolled-up strip of metal that is rolled through more than 360°, and whose section is V-shaped, such that the central region of the inside surface of the collar is smaller in diameter than are the side regions thereof.

According to the invention, the angle between the two branches of the V-shape lies in the range 120° to 165°, and the ratio between the thickness of the strip and the length of each branch lies in the range 0.2 to 0.5.

The selected ranges for the angle between the branches of the V-shape and for the ratio between the thickness and the length of each branch, as specified by the invention naturally take account of the values that are generally accepted in the present state of the art for the strength and for the ratio between the thickness of the strip and the diameter of the collar, i.e. it applies to diameters of less than 70 mm.

In this respect, it is recalled that the metal of a spring collar generally has traction strength of not less than 550 N/mm$^2$, and the ratio between the thickness of the strip and the diameter of the collar generally lies in the range 0.04 to 0.05.

The limits on the ranges of values defined by the invention would appear to require no modification in a near future, such that it seems to be appropriate to explain herein the calculations and observations that have led the Applicant to propose said ranges.

By using values within said ranges, which values are particularly easy to implement, the rigidity of the collar is increased around its entire periphery in a manner that is reliable and uniform, and consequently there is an increase in the clamping force for any thickness of the strip, while nevertheless conserving clamping pressure that is relatively limited, e.g. of the order of 10 N/cm$^2$ or 20 N/cm$^2$. These advantages are most appreciable, particularly when a flexible hose is to be clamped onto a rigid pipe.

BRIEF DESCRIPTION OF THE DRAWING

The invention will be better understood and its characteristics and advantages will appear more clearly on reading the following description given with reference to the accompanying drawing, in which:

FIG. 1 is a perspective view of a clamping spring collar of the invention; and

FIG. 2 is a fragmentary cross-section view through the ordinary portion of the collar when in place on a rubber hose.

MORE DETAILED DESCRIPTION

With reference to FIGS. 1 and 2, there can be seen a spring collar constituted by a metal strip 1 that is rolled up. The width of each of its end portions 1a and 1b is substantially equal to one-half the width of the remainder of the strip, and said end portions are provided with respective tabs 2 and 3 that project radially outwardly from the collar. In conventional manner, the tabs 2 and 3 constitute abutments for a pliers-like tool that enables the diameter of the collar to be increased by moving said tabs towards each other, thereby enabling the collar to be threaded axially onto an elongate object, in particular a flexible hose fitted over a rigid pipe. When the force applied to the tabs 2 and 3 is released, the collar clamps onto the hose by virtue of the energy stored in the spring that is constituted by the strip 1 itself.

As can be seen in FIG. 2, the cross-section of the strip 1 is not plane, but is in the form of a flattened V-shape both in the ordinary portion of the strip 1 and in its end portions 1a and 1b. The angle between the branches of the V-shape is generally wide open and lies in the range 120° to 160°, and is preferably close to 140°. It is desirable, on clamping, for the collar to penetrate partially into the hose A without giving rise to the swellings that are often observed in the vicinity of the longitudinal edges of ordinary collars constituted by a strip that is flat. Thus, there is no danger of the zone of contact between the hose A and the pipe B lifting off, nor is there any danger of leakage starting as a result. Furthermore, on clamping, a collar of the invention penetrates progressively into the wall A of the flexible hose and it has been observed that the pressure which it exerts on the hose remains limited, thereby avoiding any risk of creep in the flexible hose.

Furthermore, in order to ensure that the collar maintains a satisfactory clamping force under all circumstances of use, i.e. that the energy it stores while being installed reaches a sufficiently high level without running the risk of locally exceeding the elastic limit of the metal, it is appropriate to ensure a proper ratio between the length L of a branch of the V-shape and a thickness e of the strip. Thus, as mentioned above, this ratio should lie within the range 0.2 to 0.5.

In this respect, it has been possible to determine that, around its entire periphery, the bending moment of a collar of the invention remains below the limit at which the drawbacks arise as observed in use of collars in accordance with the above-mentioned German patent.

We claim:

1. A clamping spring collar, constituted by a rolled-up metal strip having end portions each of which is of a width substantially equal to half the width of the strip, said end portions being disposed side by side and being provided with respective tabs that are directed radially outwardly from the collar, which tabs form abutments for engaging a pliers-like tool, the strip having a cross-section that constitutes a flattened V-shape such that the central region of the inside surface of the collar has a diameter that is smaller than that of its lateral regions, wherein the angle formed between the two branches of the V-shape lies in the range 120° to 165°, and wherein the ratio between the thickness of the strip and the length of each of its branches itself lies in the range 0.2 to 0.5.

* * * * *